(12) United States Patent
Harada et al.

(10) Patent No.: US 7,443,384 B2
(45) Date of Patent: Oct. 28, 2008

(54) COORDINATES INPUT DEVICE

(75) Inventors: Keita Harada, Shinagawa (JP); Shigemi Kurashima, Shinagawa (JP); Nobuyoshi Shimizu, Shinagawa (JP); Akio Nakamura, Shinagawa (JP); Yuriko Nishiyama, Shinagawa (JP); Shinichiro Akieda, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 817 days.

(21) Appl. No.: 10/912,063

(22) Filed: Aug. 6, 2004

(65) Prior Publication Data

US 2005/0038944 A1  Feb. 17, 2005

(30) Foreign Application Priority Data

Aug. 12, 2003  (JP) .............................. 2003-292549

(51) Int. Cl.
  *G09G 5/00*  (2006.01)
(52) U.S. Cl. ........................ 345/173; 345/174; 345/175; 345/179; 178/18.01
(58) Field of Classification Search .............. 178/18.01; 345/173–175, 179
See application file for complete search history.

(56) References Cited

U.S. PATENT DOCUMENTS 6,822,635 B2 *  11/2004  Shahoian et al. ............ 345/156

FOREIGN PATENT DOCUMENTS

| EP | 1310860 | 5/2003 |
|---|---|---|
| JP | 2003-058321 | 2/2003 |
| JP | 2002-149312 | 5/2003 |

* cited by examiner

*Primary Examiner*—Richard Hjerpe
*Assistant Examiner*—Leonid Shapiro
(74) *Attorney, Agent, or Firm*—Staas & Halsey LLP

(57) ABSTRACT

A coordinates input device includes an operation unit that receives an operation input, a vibration generator that applies a vibration to the operation unit, and a vibration control unit that controls the vibration generator to apply the vibration to the operation unit when the operation input is received by the operation unit. The vibration generator includes a power feed unit provided to the operation unit, and a magnetic-field applying unit having sub-units. Each of the sub-units has first and second magnets spaced apart from each other with a given gap. The magnetic flux produced by the first and second magnets crosses a current flowing in the power feed unit.

24 Claims, 20 Drawing Sheets

COORDINATES INPUT DEVICE

BACKGROUND OF THE INVENTION

1. Field of the Invention

The present invention relates to a coordinates input device.

2. Description of the Related Art

A device equipped with a touch panel or touch pad uses a touch operation in which the touch panel is touched with a pen or finger. The conventional touch panel does not provide the feeling of a click, which may be provided in a key switch of the keyboard. Thus, depressing on the touch panel cannot be sensed, which may induce an erroneous operation. There is a proposal to use vibration to have the operator sense his/her operation on the touch panel or pad.

Japanese Laid-Open Patent Application Publication No. 2002-149312 (Document 1) discloses a portable electronic device equipped with a vibratory actuator composed of a coil and a magnet. A drive signal generating circuit drives the vibratory actuator to produce vibration when an input operation on the touch panel or operation key is accepted.

Japanese Laid-Open Patent Application Publication No. 2003-58321 (Document 2) discloses a touch panel device equipped with a transverse displacement unit that displaces the touch panel in the transverse direction and a longitudinal displacement unit that displaces the touch panel in the longitudinal direction. Each of the transverse and longitudinal displacement units is composed of a coil, a magnet and a yoke. A touch panel driver drives the displacement units to produce various vibration patterns in the two-dimensional directions.

However, the touch panel device disclosed in Document 1 has the following problem. The coil is merely arranged above the coil. Thus, it is very difficult to obtain a satisfactory thrust and produce a large magnitude of vibration on the touch panel.

The touch panel device disclosed in Document 2 has the following problem. The magnet is merely arranged between the coil and yoke. Thus, it is very difficult to obtain a satisfactory thrust and produces a large magnitude of vibration on the touch panel. Further, the two-dimensional vibration is produced in parallel with the touch panel, so that only a limited number of vibratory patterns can be obtained.

SUMMARY OF THE INVENTION

It is an object of the present invention to provide a coordinates input device capable of producing a large magnitude of thrust on an operation unit.

Another object of the present invention is to provide a coordinates input device capable of producing a large number of vibratory patterns.

These objects of the present invention are achieved by a coordinates input device comprising: an operation unit that receives an operation input; a vibration generator that applies a vibration to the operation unit; and a vibration control unit that controls the vibration generator to apply the vibration to the operation unit when the operation input is received by the operation unit, the vibration generator including: a power feed unit provided to the operation unit; and a magnetic-field applying unit having sub-units, each of the sub-units having first and second magnets spaced apart from each other with a given gap, a magnetic flux produced by the first and second magnets crossing a current flowing in the power feed unit.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of embodiments of the present invention with reference to the accompanying drawings.

First Embodiment

Figure 1:
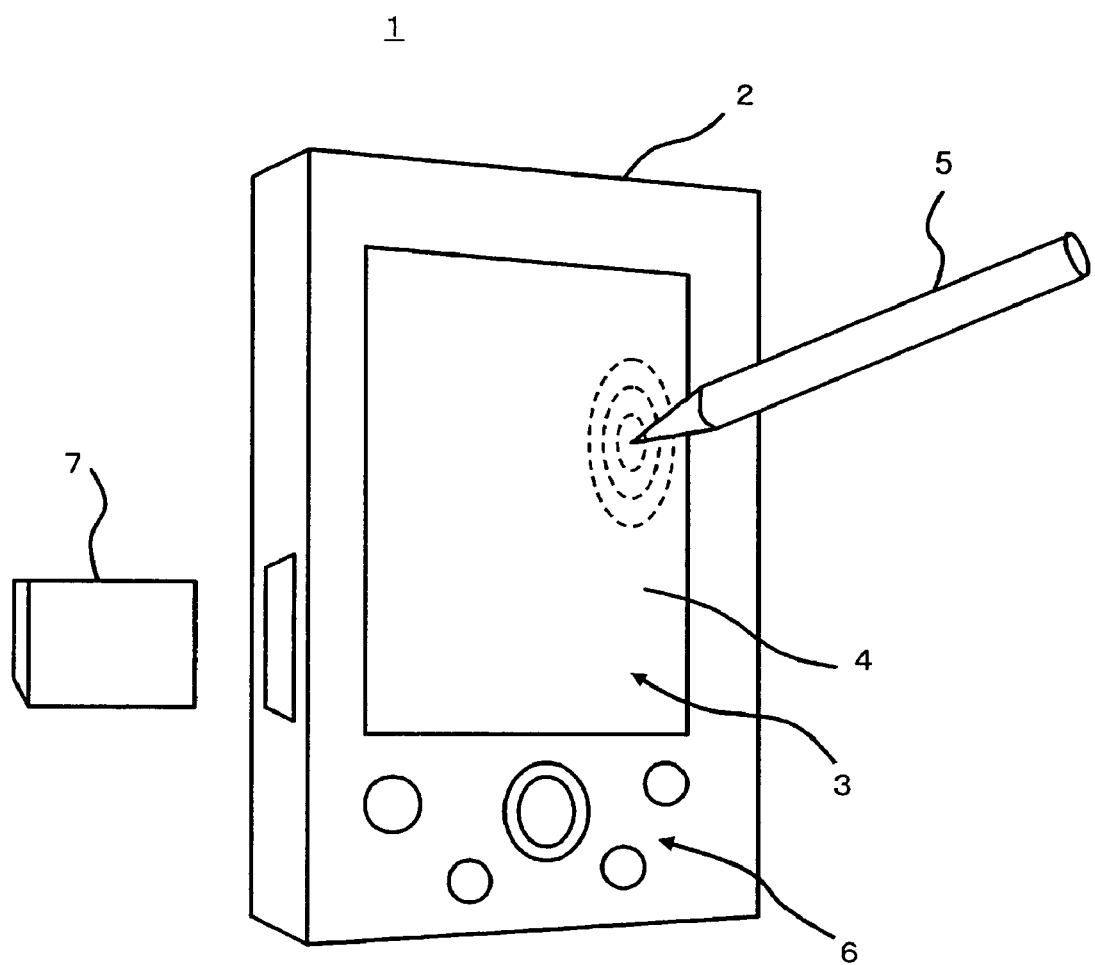
FIG. 1 is a perspective view of a portable electronic device.
Figure 2:
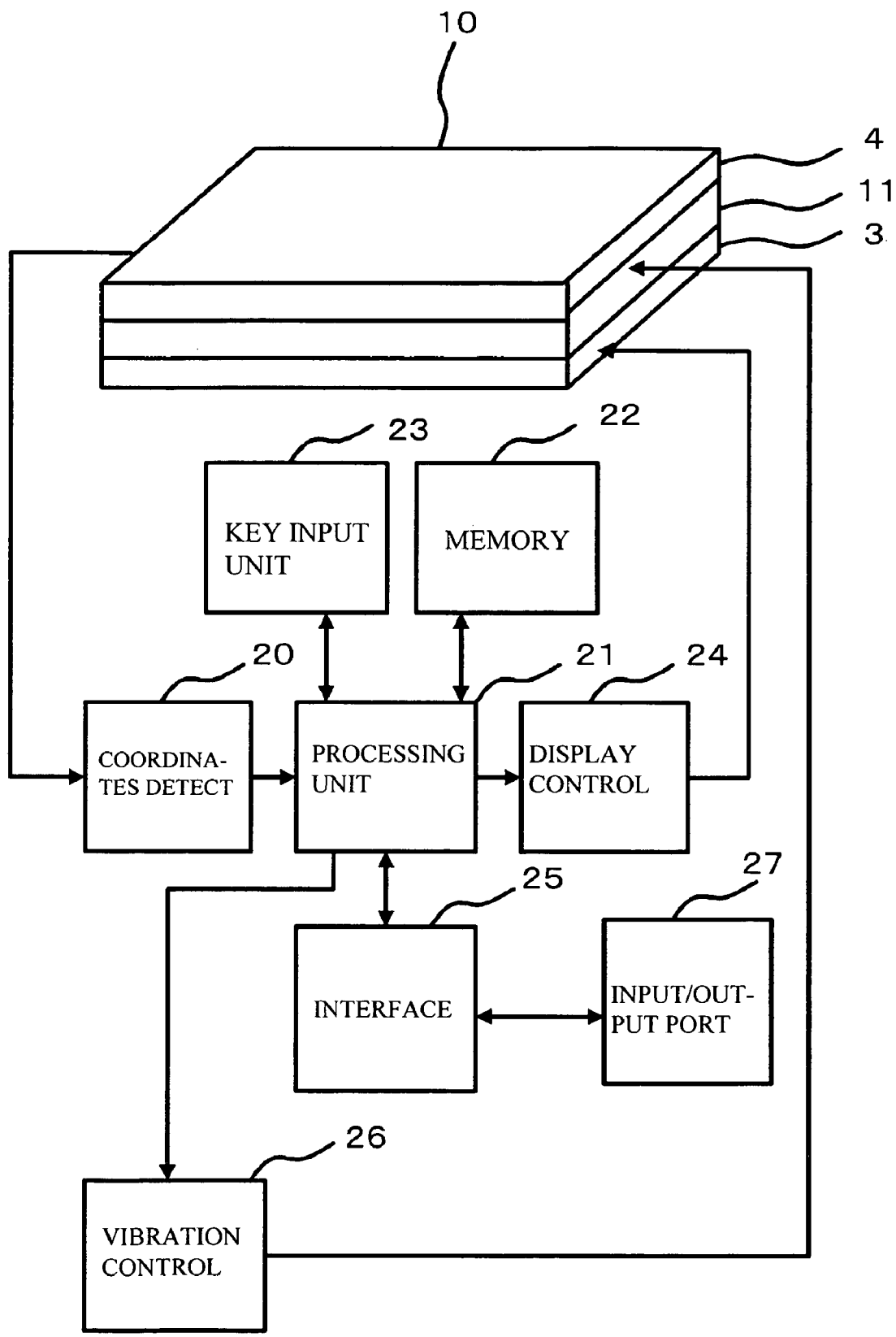
FIG. 2 is a block diagram of the portable electronic device.

FIG. 1 is a perspective view of a portable electronic device 1 according to a first embodiment of the present invention, and FIG. 2 is a diagram of a structure of the portable electronic device 1 shown in FIG. 1. The device 1 has a main body case 2 having a window via which a display screen of a display unit 3 is exposed. A transparent touch panel 4 is provided on the display screen. The user may touch the touch panel 4 with an attached pen 5 or finger, so that an instruction to the portable electronic device 1 can be input thereto.

Operation keys 6 of depression type are provided on the front panel of the main body case 2 and a reused to input instructions to the portable electronic device 1. A memory card 7 can be loaded into the portable electronic device 1. One of the operation keys 6 may be a main power switch.

As shown in FIG. 2, the portable electronic device 1 has a panel unit 10, a coordinates detection unit 20, a processing unit 21, a memory unit 22, a key input unit 23, a display control unit 24, an interface unit 25, a vibration control unit 26, and an input/output port 27. The panel unit 10 includes the display unit 3, the touch panel 4 and a vibration generator 11. The coordinates detection unit 20 detects a coordinates position at which the touch panel 4 is touched with the attached pen 5 or finger. The memory unit 22 stores a program and data for controlling the portable electronic device 1. The key input unit 23 provides the processing unit 21 with a key operation signal that corresponds to a depressing operation on the operation keys 6 by the user.

The processing unit 21 may be a CPU (Central Processing Unit), and controls the structural elements of the portable electronic device 1 by executing the program stored in the memory unit 22. The processing unit 21 executes various processes in response to input commands supplied from the key input unit 23. The display control unit 24 controls a display on the display unit 3. The interface unit 25 makes an interface between the processing unit 21 and the input/output port 27.

The vibration control unit 26 supplies the coil with a given current to control vibration of the touch panel 4. The vibration control unit 26 inverts the driving current that passes through the coil at given intervals, so that the coil 15 can be vibrated. The input/output port 27 makes a connection with the memory card 7.

The panel unit 10 will now be described in detail with reference to FIG. 3, which is an exploded perspective view of the panel unit 10. The panel unit 10 has the display unit 3, the touch panel 4 and the vibration generator 11. The display unit 3 may be a liquid crystal display (LCD). The display unit 3 is controlled by the display control unit 24.

Figure 3:
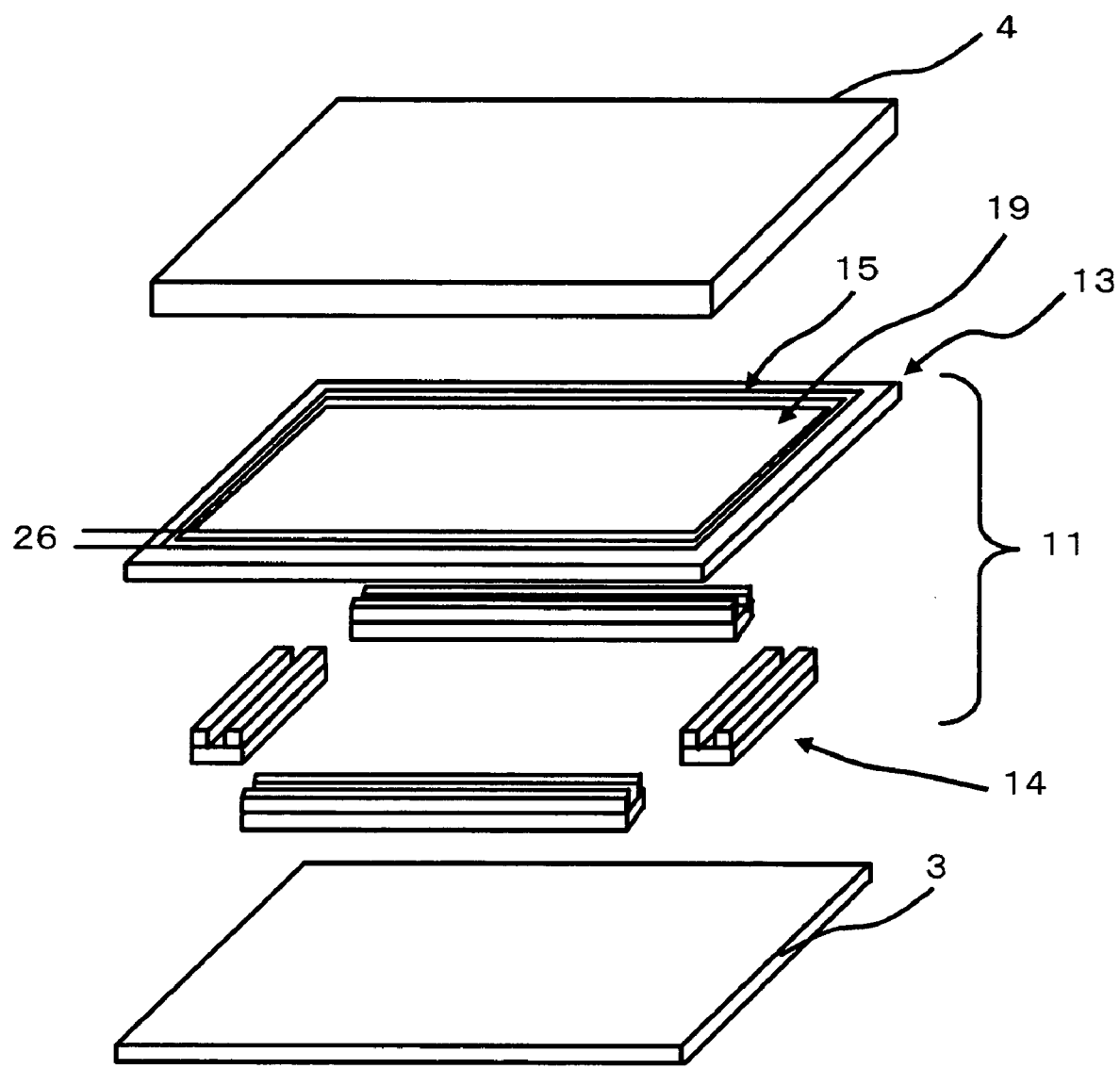
FIG. 3 is an exploded perspective view of a panel unit.

The touch panel 4 has an upper substrate, a lower substrate and a terminal substrate, although these substrates are not specifically illustrated in FIG. 3. The upper substrate has a film on which electrodes are formed. The film may be synthetic resin such as PET (PolyEthylene Terephthalate). A transparent conductive film such as ITO (Indium Tin Oxide) is formed on the entire PET film.

The lower substrate may have a glass plate. A transparent conductive film such as ITO is formed on the entire surface of the glass plate. Electrodes and interconnection lines are formed on the transparent conductive film. The terminal substrate may be a flexible printed-circuit board. The terminal substrate is used to connect the touch panel 4 to the coordinates detection unit 20. The upper substrate is bent when depressed with the pen 5 or finger, so that the transparent conductive film of the upper substrate can be brought into contact with the transparent conductive film of the lower substrate. Dot spacers are arranged between the lower substrate and the upper substrate.

The vibration generator 11 includes a power feed unit 13 and a magnetic-field applying unit 14. The power feed unit 13 includes a coil (feeder line) 15 in which a given current flows, and transparent resin films 19. The coil 15 is sandwiched between the upper and lower resin films 19. The coil 15 is connected to the vibration control unit 26 from which driving current is supplied to the coil 15. The magnetic-field applying unit 14 applies a magnetic field to the coil 15. The magnetic field thus applied is parallel to the coordinates input plane of the touch panel 4 and crosses the coil 15. In the structure shown in FIG. 3, the magnetic-field applying unit 14 is composed of four sub-units, each of which sub-units is arranged below a corresponding one of the four sides of the power feed unit 13.

Figure 4A:
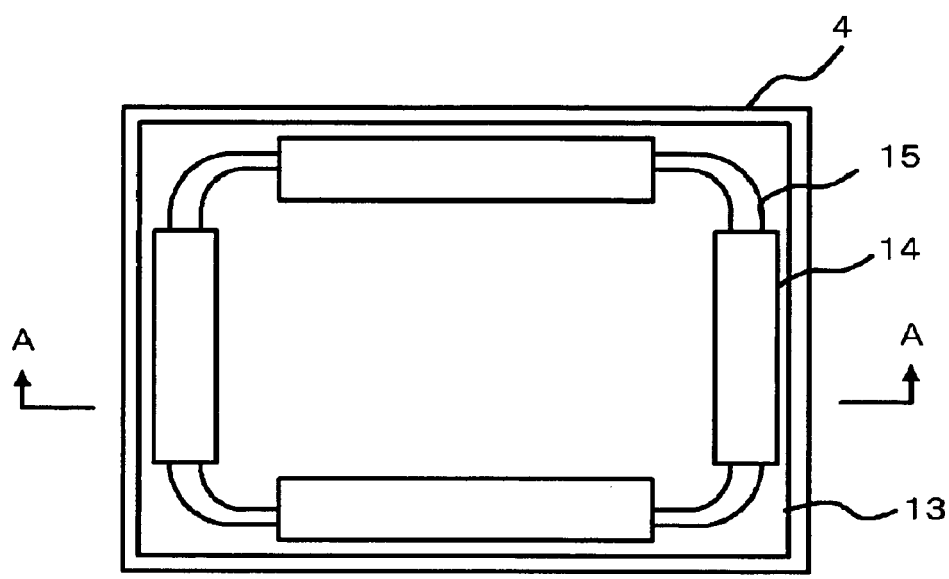
FIG. 4A is a schematically plan view of a vibration generator from the backside of a magnetic-field applying unit.
Figure 4B:
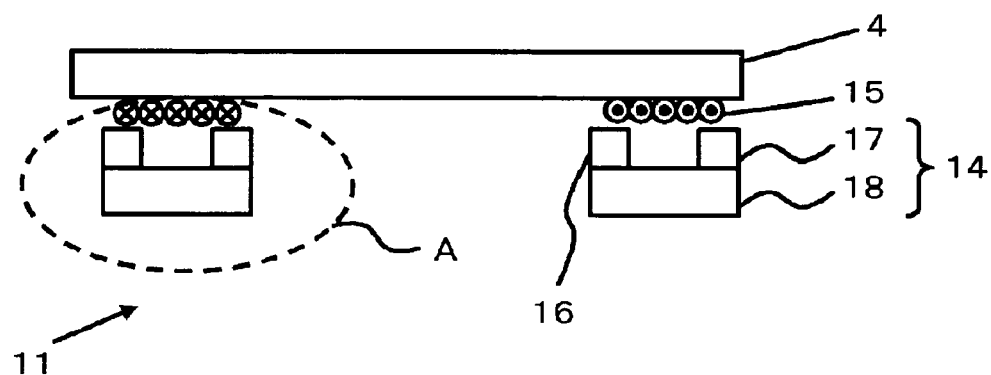
FIG. 4B is a sectional view taken along a line A-A shown in FIG. 4A.

FIGS. 4A and 4B schematically show an arrangement of the vibration generator 11. More particularly, FIG. 4A is a view of the touch panel 4 from the magnetic-field applying unit 14 shown in FIG. 3, and FIG. 4B is a sectional view taken along a line A-A shown in FIG. 4A. The coil 15 of the power feed unit 13 is arranged along the sides of the touch panel 4. The four sub-units of the magnetic-field applying unit 14 are located below the coil 15. Each of the four sub-units is composed of a first magnet 16, a second magnet 17 and a yoke 18.

Figure 5:
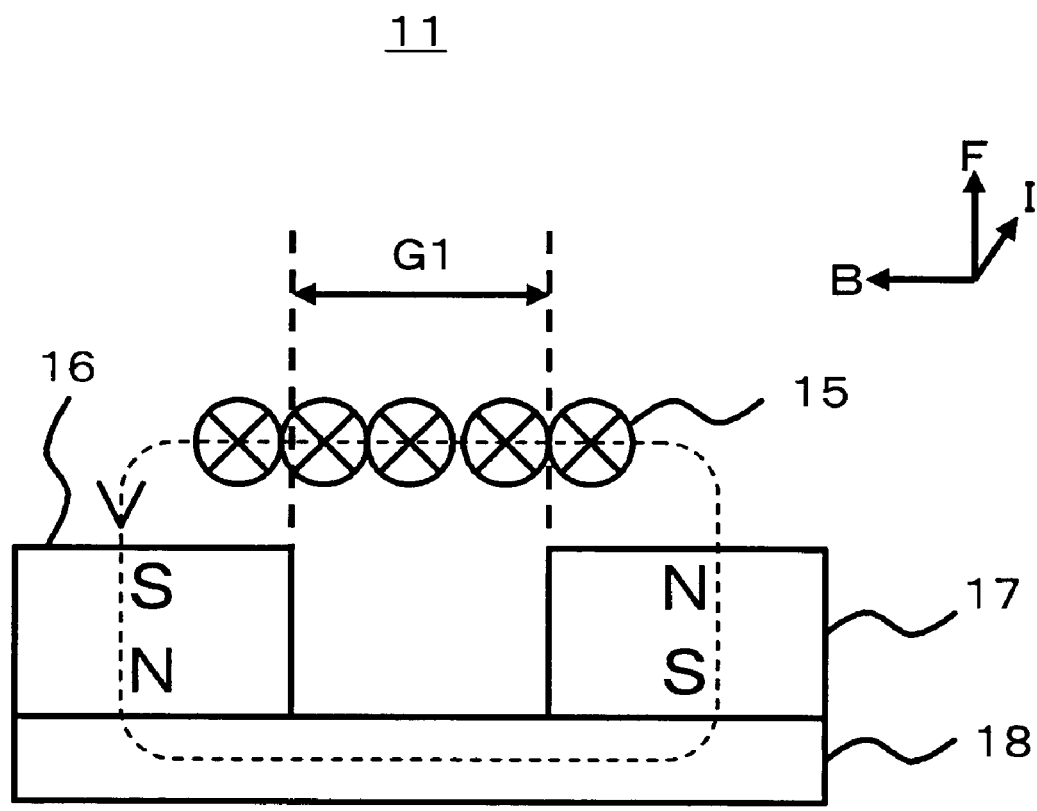
FIG. 5 shows a vibration generator according to a first embodiment of the present invention.

FIG. 5 is an enlarged view of a part A of the vibration generator 11 shown in FIG. 4B. In FIG. 5, the transparent resin films 19 are omitted for the sake of simplicity. As shown in FIG. 5, the vibration generator 11 is composed of the coil 15, the first magnet 16, the second magnet 17 and the yoke 18. The first magnet 16 and the second magnet 17 are spaced apart from each other so as to have a given gap G1 on the yoke 18. The first magnet 16 and the second magnet 17 have opposite arrangements of poles.

The N pole of the first magnet 16 is arranged so as to contact the yoke 18, and the S pole of the second magnet 17 is arranged so as to contact the yoke 18. The coil 15 is arranged so as to locate above the first magnet 16, the gap G1 and the second magnet 17. The magnetic field outgoing from the N pole of the first magnet 16 passes through the yoke 18 and enters into the S pole of the second magnet 17. The magnetic field outgoing from the N pole of the second magnet 17 crosses the current flowing in the coil 15, and enters into the S pole of the first magnet 16.

When the driving current is applied to the coil 15 from the vibration control unit 26 in the direction shown in FIG. 5, the magnetic field from the N pole of the second magnet 17 crosses the current flowing in the coil 15, and enters into the S pole of the first magnet 16. Thrust (force) F due to the Fleming's left-hand rule is exerted on the coil 15. The coil 15 is moved in the direction of the thumb while current I flows in the direction of the second finger and the magnetic flux B flows in the direction of the first finger.

Figure 6:
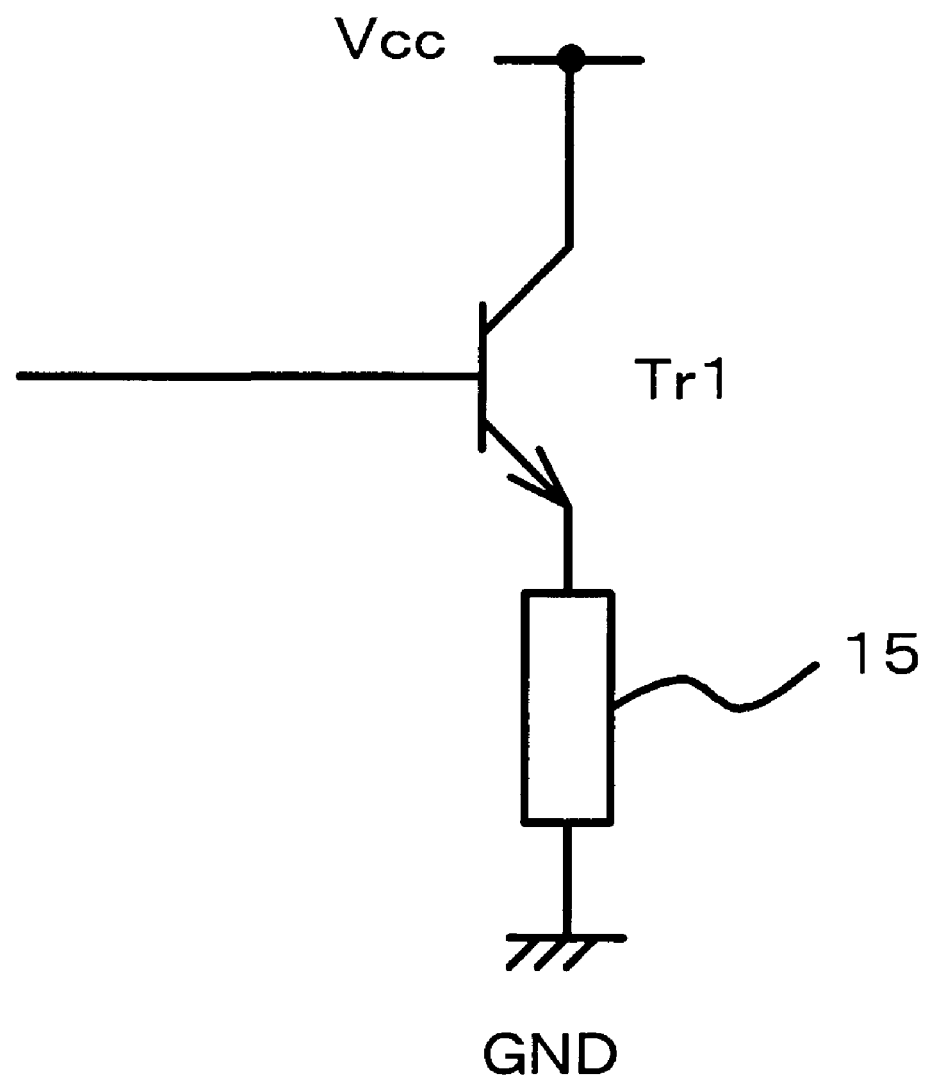
FIG. 6 shows a vibration control unit employed in the first embodiment of the present invention.
Figure 7:
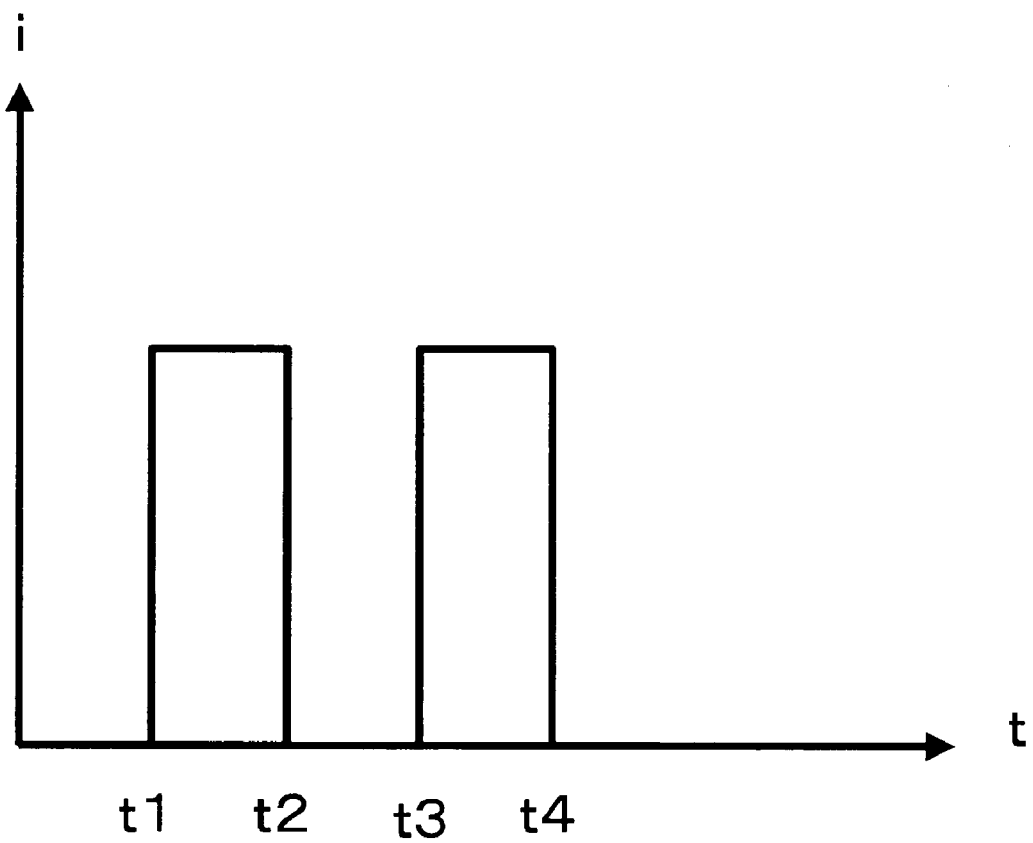
FIG. 7 is a waveform diagram of a driving current supplied to a coil used in the first embodiment of the present invention.

The vibration control unit 26 will now be described with reference to FIGS. 6 and 7. FIG. 6 is a circuit diagram of the vibration control unit 26 employed in the first embodiment of the present invention. FIG. 7 shows the driving current applied to the coil 15. As shown in FIG. 6, the vibration control unit 26 has an NPN transistor Tr1. The base of the transistor Tr1 is connected to the processing unit 21, and the collector thereof is connected to a power supply VCC, the emitter being connected to the coil 15. The processing unit 21 turns ON and OFF the transistor Tr1 so that the pulse signal shown in FIG. 7 is supplied to the coil 15 as the driving current.

Figure 8:
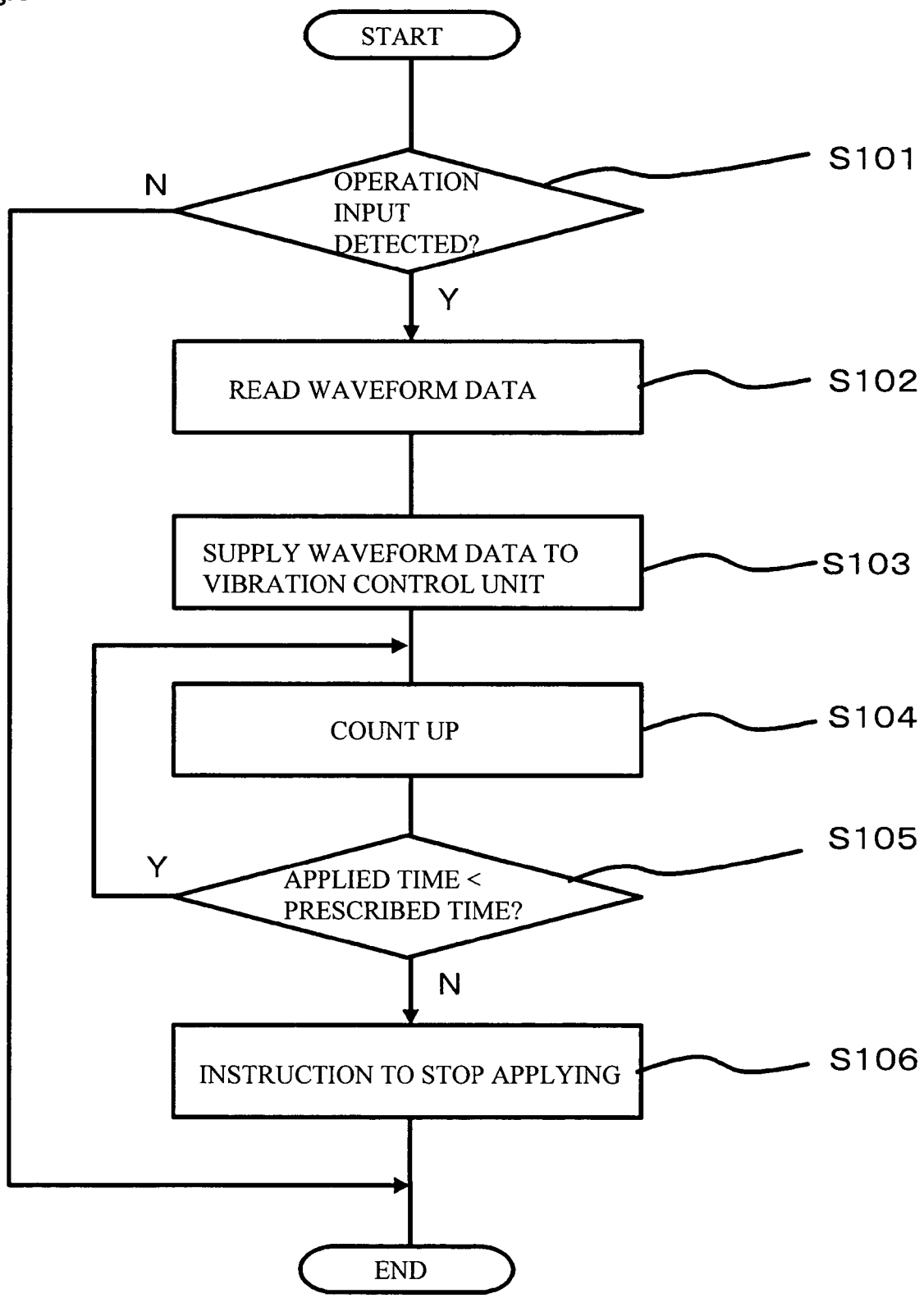
FIG. 8 is a flowchart of a vibration control process.

A description will now be given of an operation of the coordinates input device according to the first embodiment of the present invention. FIG. 8 is a flowchart of a vibration control sequence, which may be periodically executed by the processing unit 21 while an input operation on the touch panel 4 and the operation keys 6 is allowed.

At step S101, the processing unit 21 determines whether a touch signal is received produced from the touch panel 4 and determines whether a key operation signal is received from the key input unit 23. When the processing unit 21 determines that neither the touch signal nor the key operation signal is received, the unit 21 ends the vibration control process. In contrast, when the processing unit 21 determines that either the touch signal or the key operation signal is received, at step S102, the processing unit 21 reads, from the memory unit 22, data that describes the waveform of the driving signal applied to the driving control unit 26.

At step S103, the processing unit 21 supplies the vibration control unit 26 with the waveform data read from the memory 22. The transistor Tr1 of the vibration control unit 26 supplies the driving current shown in FIG. 7 to the coil 16. The coil 15 is supplied with the driving current during the period between time t1 and time t2 shown in FIG. 7.

Thus, the magnetic field outgoing from the N pole of the second magnet 17 crosses the current flowing in the coil 15. This results in upward thrust F due to the Fleming's left-hand rule. During the period between time t2 and t3, no current is supplied to the coil 15. Thus, there is no current that crosses the magnetic field from the N pole of the second magnet 17, so that thrust F due to the Fleming's left-hand rule cannot be produced. In this matter, the touch panel 4 can be vibrated in the direction perpendicular to the input plane of the touch panel 4.

At step S104, the processing unit 21 starts to count up the count value for measuring the current supply time. At step S105, the processing unit 21 determines whether the count value has reached a predetermined count value equal to the prescribed current supply time. When it is determined the current supply time exceeds the prescribed time, the processing unit 21 instructs the driving control unit 26 to stop supplying the current to the coil 15, and ends the process.

According to the first embodiment of the present invention, the touch panel 4 is vibrated when the operator touches the touch panel 4. Thus, the operator can receive the feeling of a click. The gap G1 between the first magnet 16 and the second magnet 17 allows an increased number of turns of the coil 15 to be arranged. This produces a larger magnitude of thrust exerted on the touch panel 4.

Second Embodiment

Figure 9:
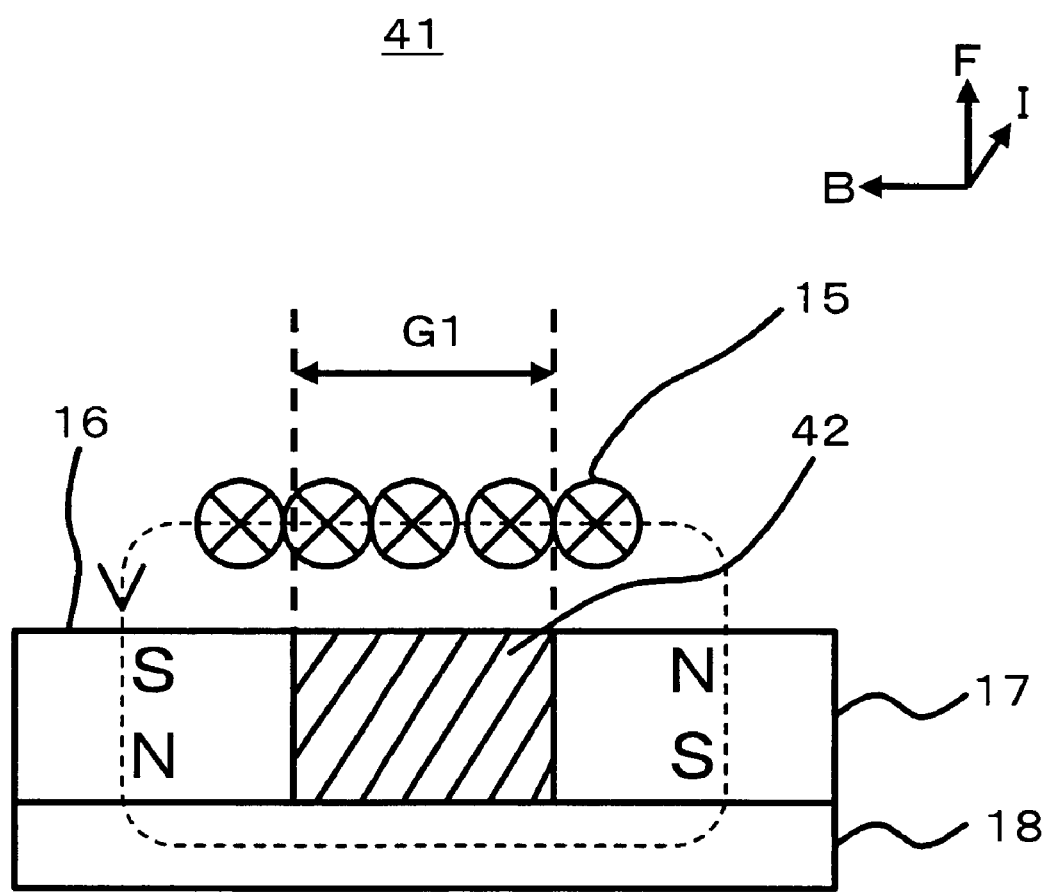
FIG. 9 shows a vibration generator according to a second embodiment of the present invention.

A description will now be given of a coordinates input device equipped with another vibration generator according to a second embodiment of the present invention. FIG. 9 shows such a vibration generator, which corresponds to the vibration generator of the first embodiment shown in FIG. 5. In FIG. 9, the transparent resin films 14 are not illustrated for the sake of convenience. A vibration generator 41 employed in the second embodiment of the invention includes the coil 15, the first magnet 16, the second magnet 17, the yoke 18, and a spacer 42. In FIG. 9, parts that are the same as those shown in the previously described figures are given the same reference numerals.

The spacer 42 is provided in the gap G1 between the first magnet 16 and the second magnet 17. The spacer 42 improves the degree of precision in positioning the gap G1. Preferably, the spacer 42 is made of a nonmagnetic material.

According to the second embodiment, the spacer 42 contributes to positioning the gap G1 between the first magnet 16 and the second magnet 17, so that the touch panel 4 can be vibrated more precisely.

Third Embodiment

Figure 10:
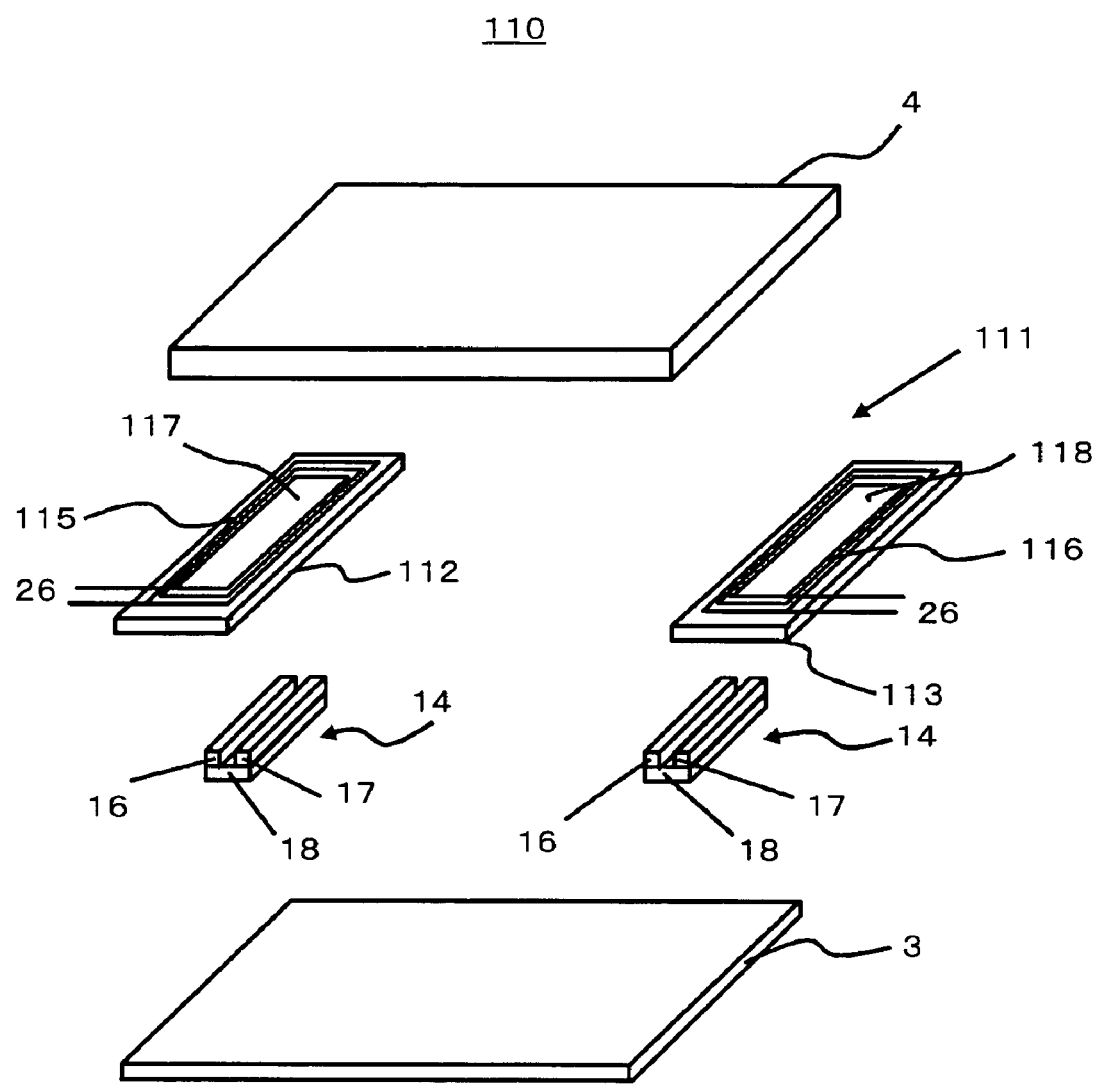
FIG. 10 is an exploded perspective view of a panel unit according to a third embodiment of the present invention.
Figure 11:
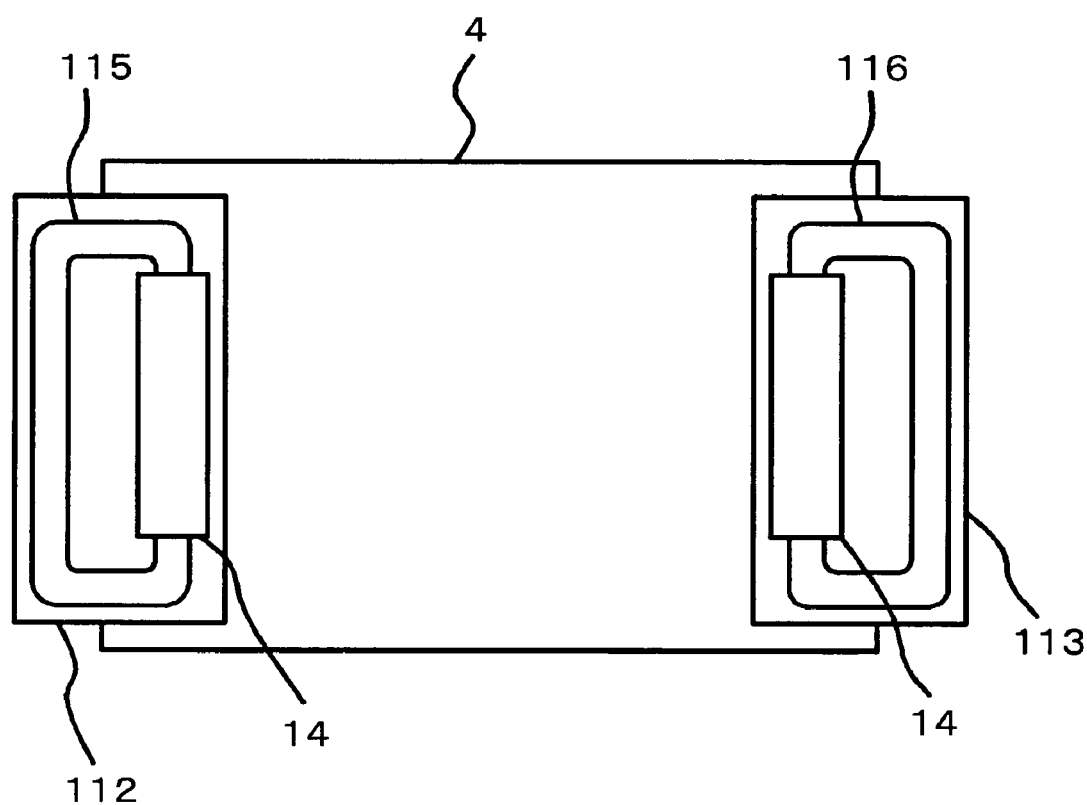
FIG. 11 shows an arrangement of a vibration generator employed in the third embodiment.

FIG. 10 is an exploded perspective view of a panel unit employed in a coordinates input device according to a third embodiment of the present invention. FIG. 10 corresponds to FIG. 3 of the first embodiment. FIG. 11 schematically illustrates an arrangement of the vibration generator employed in the third embodiment, and shows a view of the touch panel 4 from the magnetic-field applying unit 14 shown in FIG. 10. In FIGS. 10 and 11, parts that are the same as those shown in the previously described figures are given the same reference numerals.

As shown in FIG. 10, a panel unit 110 includes the touch panel 4, a vibration generator 111, and the display unit 3. The vibration generator 111 has a first power feed unit 112, a second power feed unit 113, and the magnetic-field applying unit 14. The first power feed unit 112 and the second power feed unit 113 are arranged along two opposing sides of the touch panel 4. The power feed unit 112 has a coil 115 in which the driving current flows, and transparent resin films 117. Similarly, the power feed unit 113 has a coil 116, and transparent resin films 118. The coil 115 is sandwiched between the two transparent resin films 117. Similarly, the coil 116 is sandwiched between the transparent resin films 118. The coils 115 and 116 are connected to the vibration control unit 26.

The magnetic-field applying unit 14 has two sub-units respectively associated with the power feed units 112 and 113. Each of the sub-units of the magnetic-field applying unit 14 is made up of the first magnet 16, the second magnet 17 and the yoke 18. The sub-units of the magnetic-field applying unit 14 supplies the coils 115 and 116 with the magnetic fields that are parallel to the coordinates input surface of the touch panel 4 and cross the coils 115 and 116. Preferably, a gap is formed between the first magnet 16 and the second magnet 17. More preferably, a spacer is interposed between the gap.

As shown in FIG. 11, the first power feed unit 112 and the second power supply unit 113 are arranged along two opposing sides of the touch panel 4 and are close to the backside of the touch panel 4 opposite to the side of the coordinates input surface. The coils 115 and 116 are arranged along the opposing sides of the touch panel 4. Thus, the two sub-units of the magnetic-field applying unit 14 are disposed below the coils 115 and 116.

In operation, the vibration control unit 26 supplies the driving current to the coil 115 with a given period. The magnetic field outgoing from the second magnet 17 crosses the current flowing in the coil 115, so that thrust due to the Fleming's left-hand rule can be exerted thereon. The vibration control unit 26 supplies the driving current to the coil 116 with a period different from that with which the driving current is applied to the coil 115. The magnetic field outgoing from the second magnet 17 crosses the current flowing in the coil 116, so that thrust due to the Fleming's left-hand rule can be exerted thereon. Thus, the coils 115 and 116 are capable of producing different vibration patterns.

According to the third embodiment of the present invention, the separate coils 115 and 116 are provided along the two opposing sides of the touch panel 4, so that different vibration patterns can be produced by means of the coils 115 and 116. It is thus possible to provide the user with various vibration patterns associated with different click feelings.

Fourth Embodiment

Figure 12:
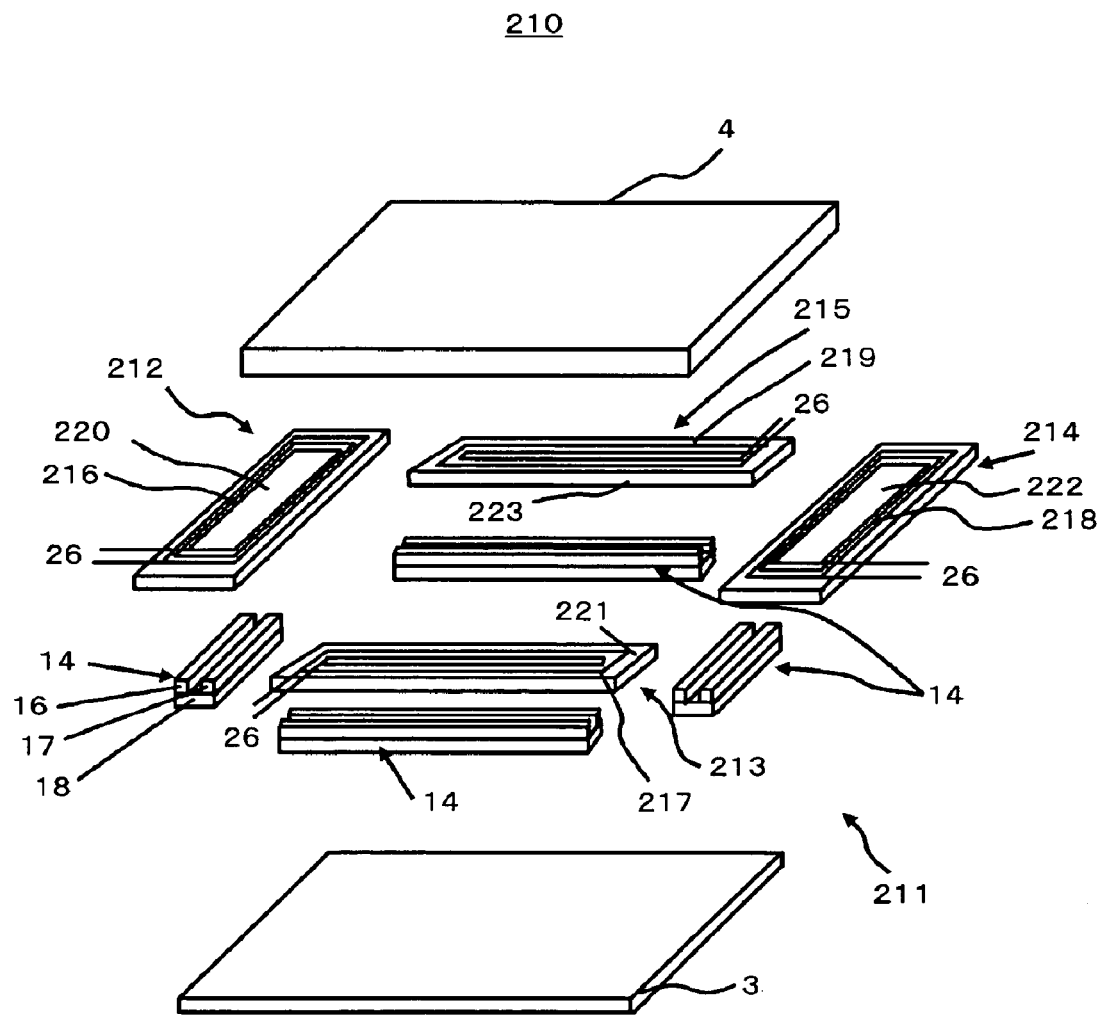
FIG. 12 is an exploded perspective view of a panel unit according to a fourth embodiment of the present invention.
Figure 13:
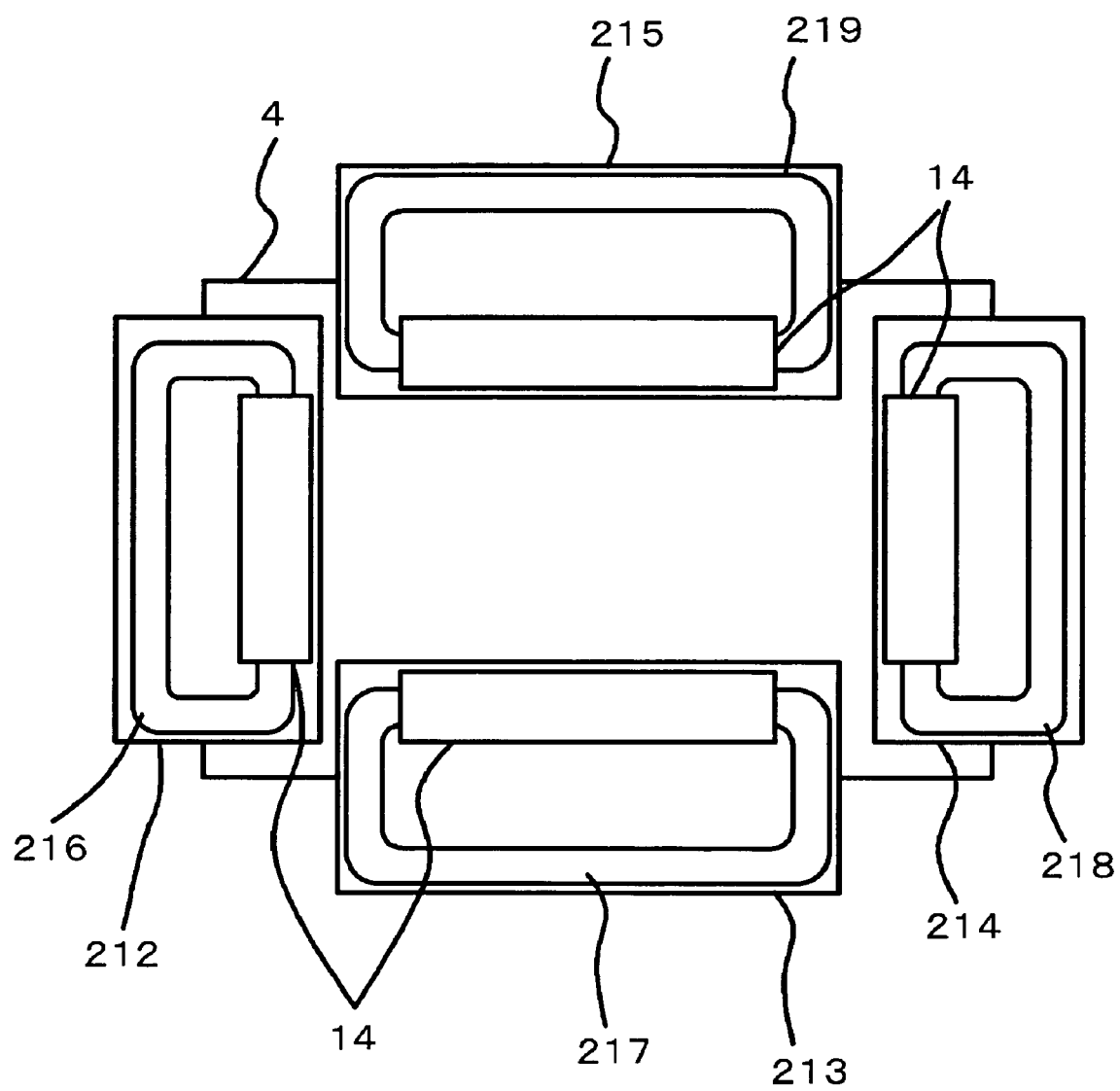
FIG. 13 sows an arrangement of a vibration generator employed in the fourth embodiment.

FIG. 12 is an exploded perspective view of a panel unit employed in a coordinates input device according to a fourth embodiment of the present invention. FIG. 12 corresponds to FIG. 3 of the first embodiment. FIG. 13 shows a view of an arrangement of a vibration generator employed in the fourth embodiment form the magnetic-field applying unit 14 shown in FIG. 12, and corresponds to FIG. 4A of the first embodiment. In FIGS. 12 and 13, parts that are the same as those shown in the previously described figures are given the same reference numerals.

As shown in FIG. 12, a panel unit 210 has the touch panel 4, a vibration generator 211, and the display unit 3. The vibration generator 211 includes a first power feed unit 212, a second power feed unit 213, a third power feed unit 214, a fourth power feed unit 215 and the magnetic-field applying unit 14. The power feed units 212, 213, 214 and 215 are respectively arranged along the four sides of the touch panel 4.

The power feed units 212 through 215 have coils 216 through 219 and transparent resin films 220 through 223, respectively. Each of the coils 216 through 219 is sandwiched between the respective transparent resin films. The coils 216 through 219 are connected to the vibration control unit 26.

The magnetic-field applying unit 14 has four sub-units associated with the power feed units 212 through 215. Each of the sub-units has the first magnet 16, the second magnet 17 and the yoke 18. The sub-units supply the coils 216 through 219 with the magnetic fields that are parallel to the coordinates input plane of the touch panel 4 and cross the coils 216 and 219. Preferably, a gap is provided between the first magnet 16 and the second magnet 17. More preferably, a spacer is provided in the gap.

As shown in FIG. 13, the power feed units 212 through 215 are arranged along the four sides of the touch panel 4 and are close to the backside of the touch panel 4 opposite to the side of the coordinates input surface. Thus, the coils 216 through 219 are arranged along the sides of the touch panel 4. The sub-units of the magnetic-field applying unit 14 are located below the coils 216 through 219.

In operation, the vibration control unit 26 supplies the driving current to the coil 216 with a given period. The magnetic field outgoing from the second magnet 17 crosses the current flowing in the coil 26, so that thrust is exerted on the coil 216 due to the Fleming's left-hand rule. The vibration control unit 26 supplies the driving current to the coil 217 with a period different from that with which the driving current is supplied to the coil 216. The resultant magnetic field from the second magnet 217 crosses the current flowing in the coil 217, so that thrust is exerted on the coil 217 due to the Fleming's left-hand rule.

The vibration control unit 26 supplies the driving current to the coil 218 with a period different from the periods with which the driving currents are supplied to the coils 216 and 217. The resultant magnetic field from the second magnet 17 crosses the current flowing in the coil 218, so that thrust is exerted on the coil 218 due to the Fleming's left-hand rule. The vibration control unit 26 supplies the driving current to the coil 219 with a period different from the periods with which the driving currents are supplied to the coils 216, 217 and 218. The resultant magnetic field from the second magnet 17 crosses the current flowing in the coil 219, so that thrust is exerted on the coil 219 due to the Fleming's left-hand rule. Thus, the coils 216 through 219 produce different the vibration patterns.

According to the fourth embodiment of the present invention, the separate coils 216 through 219 are provided along the four sides of the touch panel 4, so that the respective coils 216 through 219 can produce mutually different vibration patterns. It is thus possible to provide the user with a lot of vibration patterns associated with the different click feelings.

Fifth Embodiment

Figure 14:
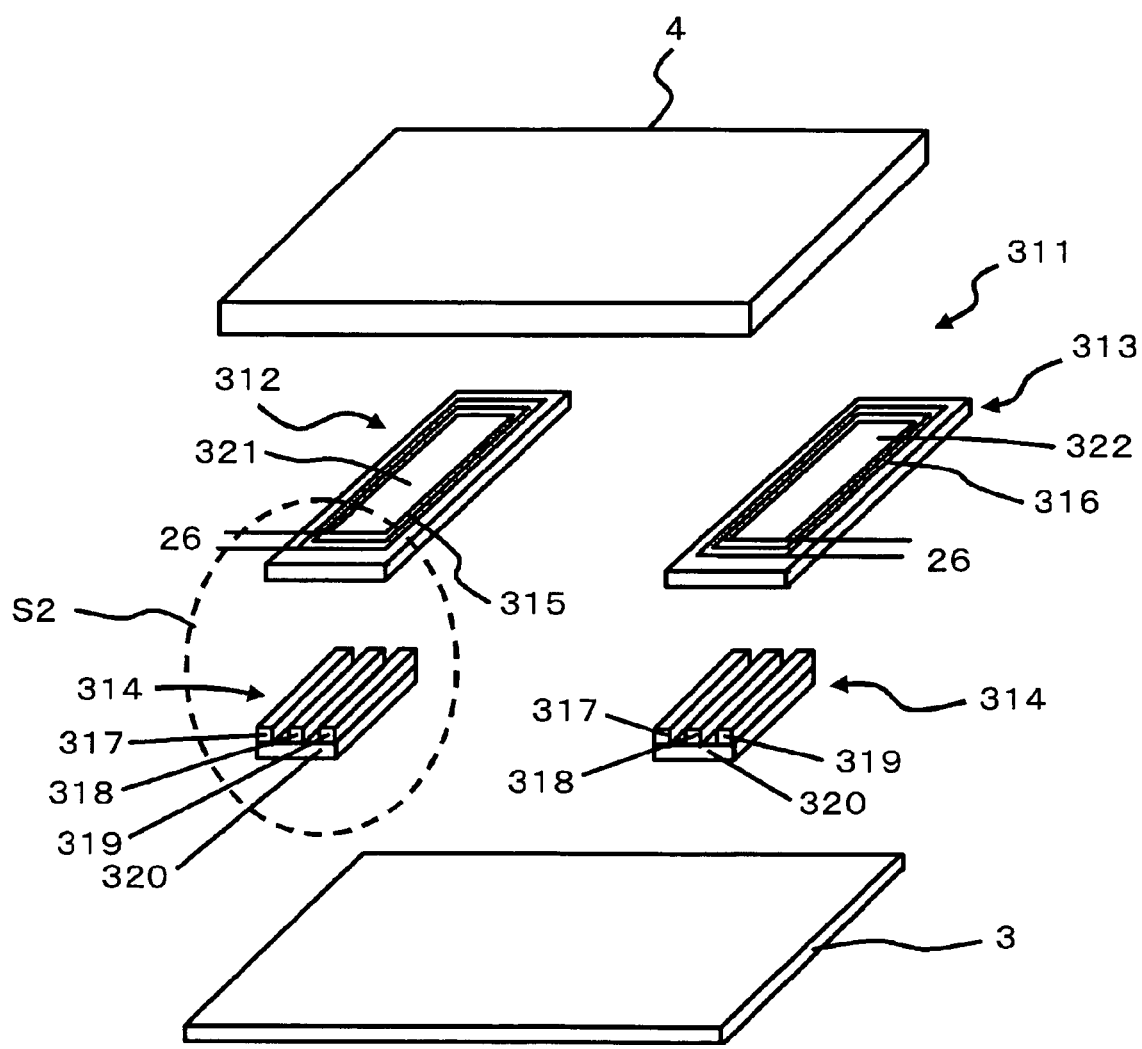
FIG. 14 is an exploded perspective view of a panel unit according to a fifth embodiment of the present invention.

FIG. 14 is an exploded perspective view of a panel unit employed in a coordinates input device according to a fifth embodiment of the present invention. FIG. 14 corresponds to FIG. 3 of the first embodiment. In FIG. 14, parts that are the same as those shown in the previously described figures are given the same reference numerals.

As shown in FIG. 14, the panel unit includes the display unit 3, the touch panel 4, and a vibration generator 311. The vibration generator 311 includes a first power feed unit 312, a second power feed unit 313 and a magnetic-field applying unit 314. The first power feed unit 312 and the second power feed unit 313 are arranged along the two opposing sides of the touch panel 4. The power feed units 312 and 313 include coils 315 and 316 and transparent resin films 321 and 322.

The coil 315 is sandwiched between the two transparent resin films 321. Similarly, the coil 316 is sandwiched between the two transparent resin films 322. The coils 315 and 316 are connected to the vibration control unit 26. The magnetic-field applying unit 314 has two sub-units respectively associated with the first and second power feed units 312 and 313. The magnetic-field applying unit 314 supplies the magnetic fields that are parallel to the coordinates input surface of the touch panel 4 and cross the coils 315 and 316.

Figure 15:
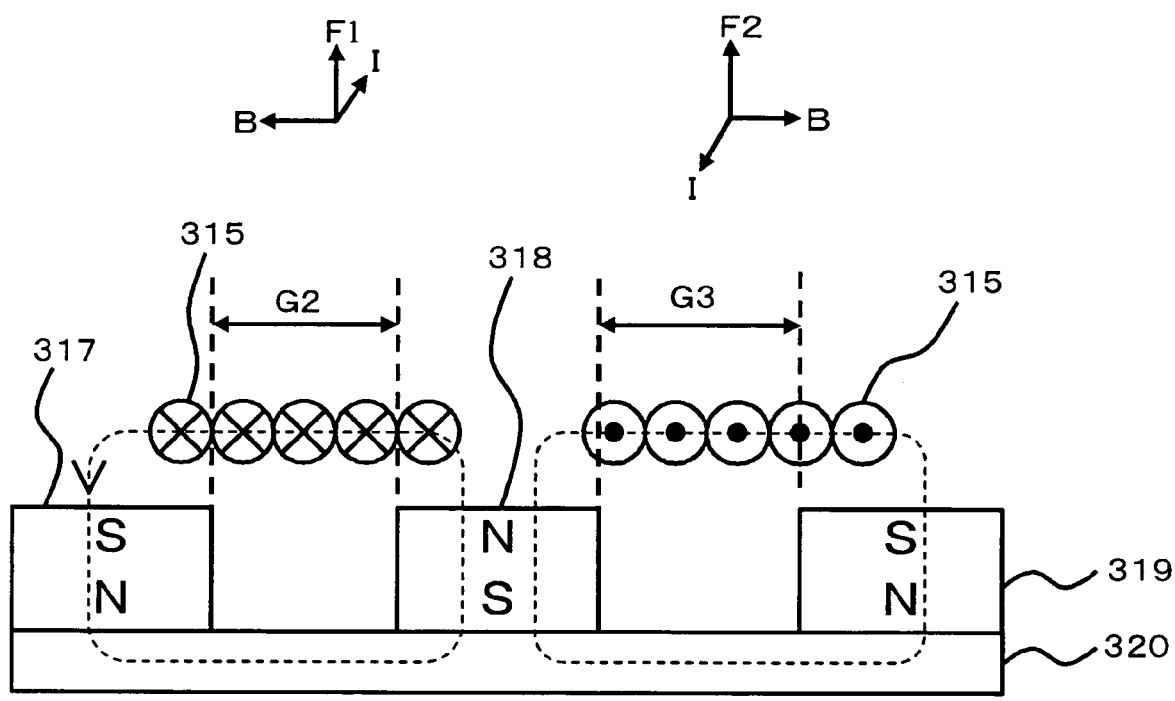
FIG. 15 shows an arrangement of a vibration generator employed in the fifth embodiment.

FIG. 15 is an enlarged view of a part surrounded by a broken line S1 shown in FIG. 14. In FIG. 15, the transparent resin films 321 are omitted for the sake of simplicity. As shown in FIG. 15, the vibration generator 311 has the coil 315, a first magnet 317, a second magnet 318 and a yoke 320. The first magnet 317 and the third magnet 319 are spaced apart from the second magnet 318 on the yoke 320. A given gap G2 is formed between the first magnet 317 and the second magnet 318. A similarly, a given gap G3 is formed between the second magnet 318 and the third magnet 319. The first magnet 317 and the second magnet 318 are provided on the yoke 320 in the magnetically opposite directions. Similarly, the second magnet 318 and the third magnet 319 are provided on the yoke 320 in the magnetically opposite directions. Spacers may be provided in the gaps G2 and G3.

The first magnet 317 and the third magnet 319 are arranged so that the N poles thereof contact the yoke 320, and the second magnet 318 is arranged so that the S pole thereof contacts the yoke 320. The magnetic field from the N pole of the first magnet 317 passes through the yoke 320 and enters into the S pole of the second magnet 318. The magnetic field from the N pole of the second magnet 318 crosses the current flowing in the coil 315 and enters into the S pole of the first magnet 317. Thus, upward thrust F1 is exerted on the coil 315 due to the Fleming's left-hand rule.

The magnetic field from the N pole of the third magnet 319 passes through the yoke 320 and enters into the S pole of the second magnet 318. The magnetic field from the N pole of the second magnet 318 crosses the current flowing in the coil 315 and enters into the S pole of the third magnet 319. Thus, thrust F2 is upward exerted on the coil 315 due to the Fleming's left-hand rule. The touch panel 4 is moved by the resultant of the thrusts F1 and F2, so that the touch panel can be vibrated with the doubled amplitude.

In operation, the vibration control unit 26 supplies the driving current to the coil 315 with a given period. The resultant magnetic field from the second magnet 318 crosses the current flowing in the coil 315 provided above the first magnet 317 and the second magnet 318. Thus, thrust F1 is exerted on the coil 315 due to the Fleming's left-hand rule. The magnetic field from the second magnet 318 crosses the current flowing in the coil 315 provided above the second magnet 318 and the third magnet 319. Thus, thrust F2 is exerted on the coil 315 due to the Fleming's left-hand rule.

The vibration control unit 26 supplies the driving current to the coil 316 with a period different from that with which the driving current is supplied to the coil 315. The resultant magnetic field from the second magnet 318 crosses the current flowing in the coil 316 provided above the first magnet 317 and the second magnet 318. Thus, thrust F1 is exerted onto the coil 316 due to the Fleming's left-hand rule. The magnetic field from the second magnet 318 crosses the coil 316 provided above the second magnet 318 and the third magnetic field 319. Thus, thrust F2 is exerted on the coil 316 due to the Fleming's left-hand rule. Thus, each of the coils 315 and 316 is capable of producing a respective vibration pattern with a larger amplitude.

According to the fifth embodiment of the present invention, three magnets are arranged with the gaps G2 and G3. Thus, thrust resulting from the first magnet 317 and the second magnet 318 and thrust resulting from the second magnet 318 and the third magnet 319 are exerted on the coil 315. Thus, the vibration amplitude of the touch panel 4 can be doubled. Further, a large number of vibration patterns can be produced by supplying the driving currents to the coils 215 and 216 with different periods.

Sixth Embodiment

Figure 16:
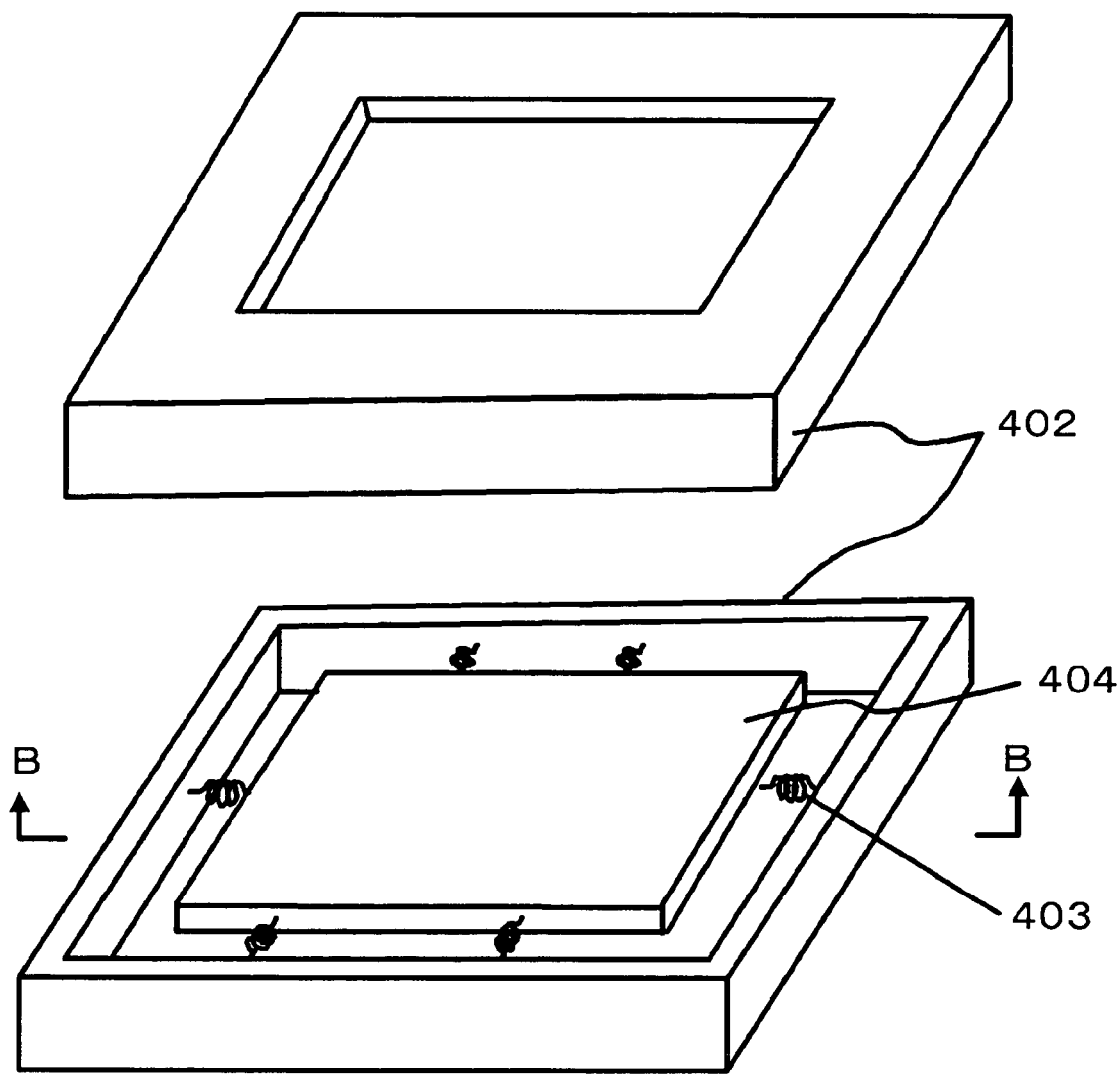
FIG. 16 is an exploded perspective view of a portable electronic device according to a sixth embodiment of the present invention.
Figure 17:
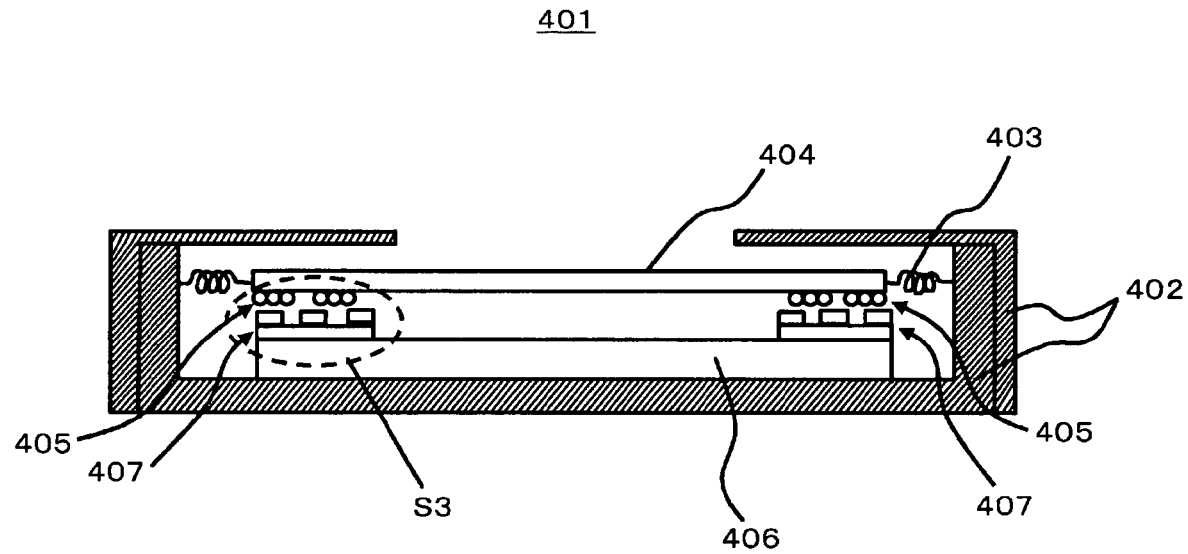
FIG. 17 is a sectional view taken along a line B-B shown in FIG. 16.

FIG. 16 is an exploded perspective view of a portable electronic device according to a sixth embodiment of the present invention. FIG. 17 is a sectional view taken along a line B-B shown in FIG. 15. A portable electronic device 401 has a main body casing 402, six springs 403, and a touch panel 404.

The touch panel 404 is attached to the inner walls of the main body casing 402 by the six springs 403. Since the springs 403 are elastic members, the pen or finger can slide the touch panel 404 on the two-dimensional plane. The six coil springs 403 may be replaced by another type of elastic body, which may be rubber.

As shown in FIG. 17, coils 405 are provided on the inner side of the touch panel 404 opposite to the input surface thereof. Each of the coils 405 is sandwiched between two transparent resin sheets (not shown for the sake of simplicity). A magnetic-field applying unit 407 composed of two sub-units is provided so as to face the coils 405. The coils 405 and the sub-units of the magnetic-field applying unit 407 form vibration generators.

Figure 18A:
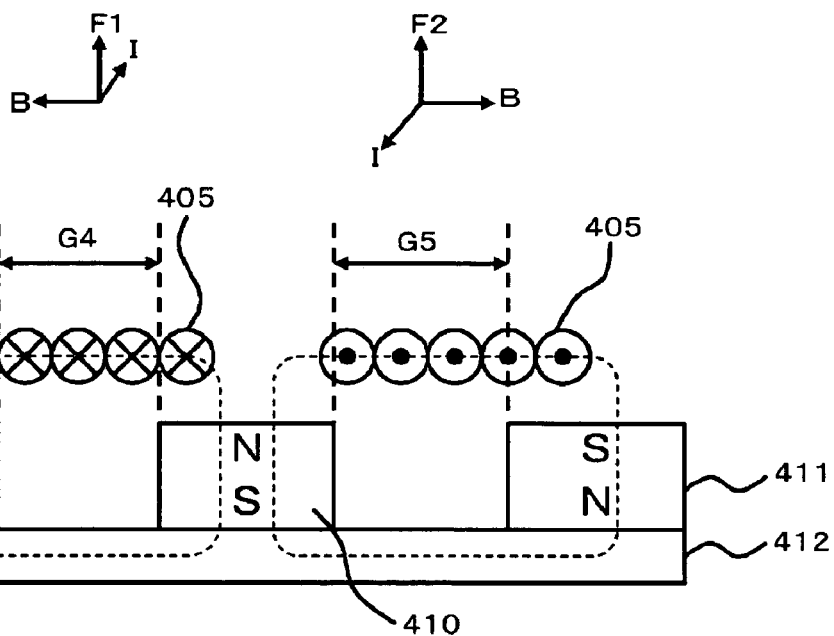
FIG. 18A shows a vibration generator employed in the sixth embodiment of the present invention in which the touch panel have not yet slid.
Figure 18B:
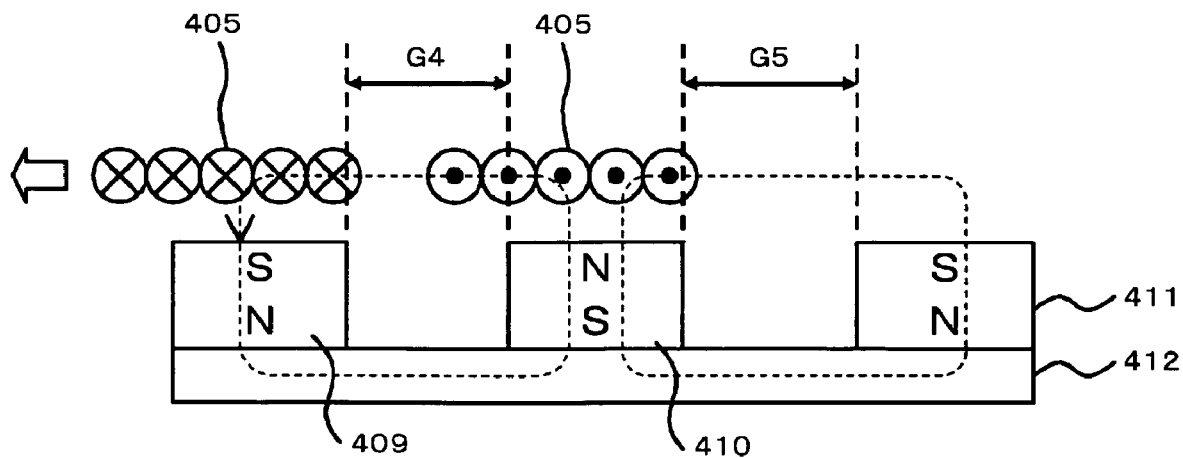
FIG. 18B shows the vibration generator employed in the sixth embodiment in which the touch panel have slid.

FIGS. 18A and 18B show a vibration generator used in the sixth embodiment of the present invention. More particularly, FIG. 18A shows the vibration generator in a state in which the touch panel 404 has not yet slid, and FIG. 18B shows the vibration generator in a state in which the touch panel 404 has slid. As shown in FIG. 18A, each of the two sub-units of the vibration generator has the coil 405, a first magnet 409, a second magnet 410, a third magnet 411 and a yoke 412.

The first magnet 409 and the second magnet 410 are spaced apart from each other on the yoke 412 with a given gap G4, and are arranged in the magnetically opposite directions. Similarly, the second magnet 410 and the third magnet 411 are spaced apart from each other on the yoke 412 with a given gap G5, and are arranged in the magnetically opposite directions. Spacers may be provided in the gaps G4 and G5.

The N poles of the first magnet 409 and the third magnet 411 are arranged so as to contact the yoke 412, and the S pole of the second magnet 410 is arranged so as to contact the yoke 412. The magnetic field from the N pole of the first magnet 409 passes through the yoke 412, and enters into the S pole of the second magnet 410. The magnetic filed from the N pole of the second magnet 410 crosses the current flowing in the coil 405, and enters into the S pole of the first magnet 409. Thus, thrust F1 is upward exerted on the coil 405 due to the Fleming's left-hand rule.

The magnetic field from the N pole of the third magnet 411 passes through the yoke 412, and enters into the S pole of the second magnet 410, and the magnetic field from the N pole of the second magnet 410 crosses the current flowing in the coil 405 and enters into the S pole of the third magnet 411. Thus, thrust F2 is upward exerted on the coil 405 due to the Fleming's left-hand rule. The touch panel 4 is thus moved by the resultant of the thrusts F1 and F2, so that the touch panel can be vibrated with the doubled amplitude.

As shown in FIG. 18B, when the touch panel 404 slides, the magnetic flux that penetrates the coil 405 is changed. Thus, electromotive force dependent on the change of the magnetic flux penetrating the coil 405 is produced due to the Faraday's law of electromagnetic induction. The direction of sliding of the panel 404 can be identified by detecting the difference between the electromotive forces produced in the coils 405 arranged along the two opposing sides of the touch panel 404. Thus, it is possible to scroll the screen based on the sliding direction of the touch panel 404.

Seventh Embodiment

Figure 19:
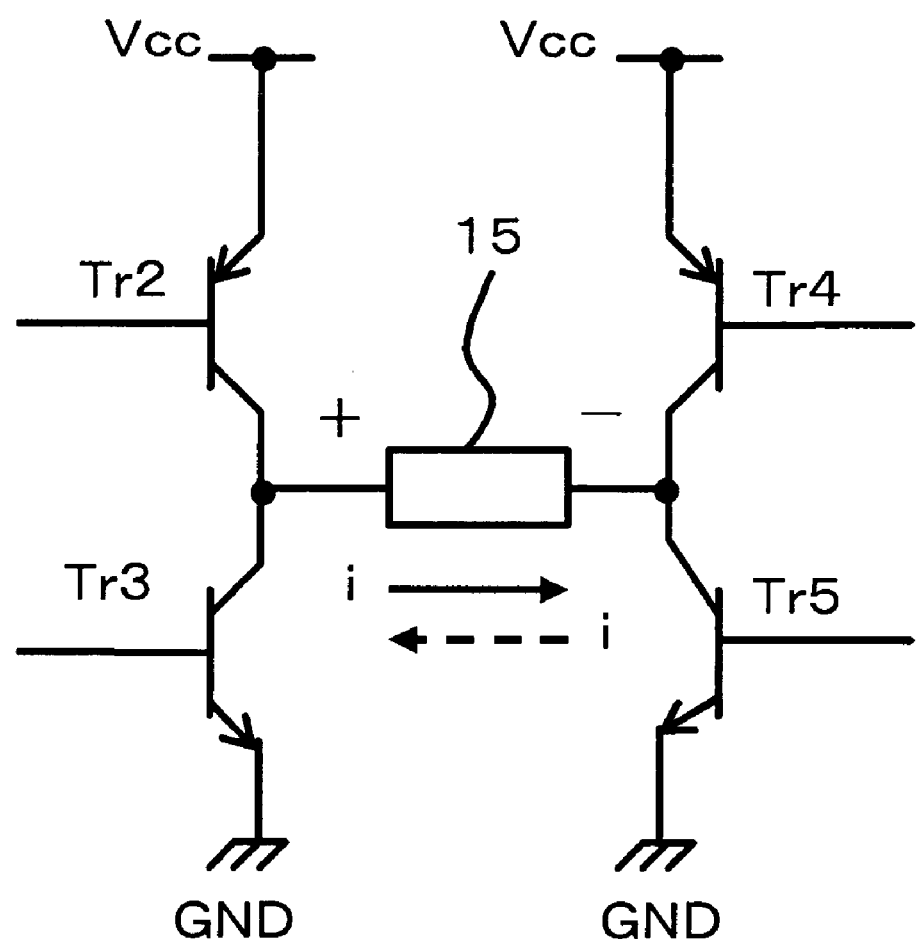
FIG. 19 shows a vibration control unit according to a seventh embodiment of the present invention.
Figure 20:
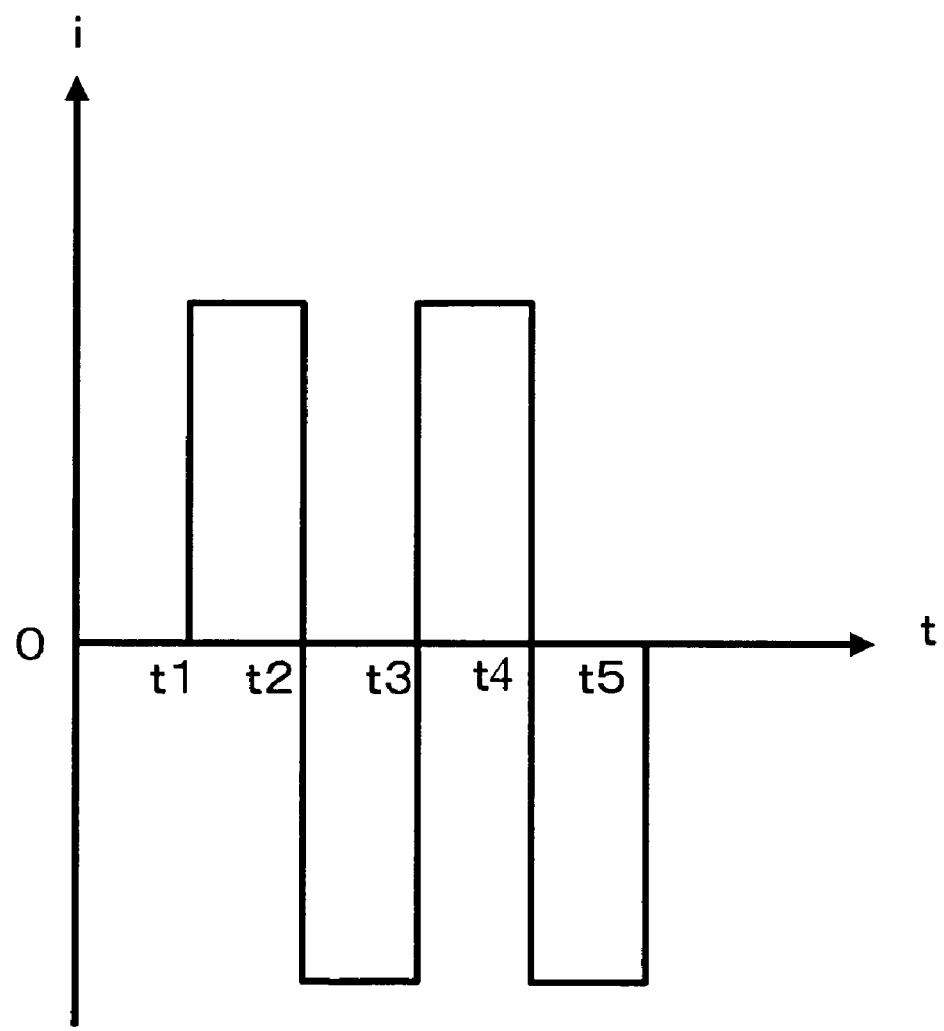
FIG. 20 is a waveform diagram of a driving current applied to the coil in the seventh embodiment of the present invention.

FIG. 19 is a circuit diagram of a vibration control unit according to a seventh embodiment of the present invention. FIG. 20 shows a driving current supplied to the coil 15 shown in FIG. 19. The structural elements of the seventh embodiment other than the vibration control are the same as those of the first embodiment. Therefore, the following description will be given with reference to FIGS. 2 and 5. The vibration control unit 26 has an H-bridge circuitry.

The vibration control unit 26 shown in FIG. 2 has two series circuits, one of which is composed of a PNP transistor Tr2 and an NPN transistor Tr3, and the other is composed of a PNP transistor Tr4 and an NPN transistor Tr5. The bases of the transistors Tr2 through Tr5 are connected to the processing unit 21. The emitters of the transistors Tr2 and Tr4 are connected to the power supply VCC.

The emitters of the transistors Tr3 and Tr5 are connected to ground GND. One end of the coil 15 is connected to a node at which the transistors Tr2 and Tr3 are connected in series, and the other end thereof is connected to a node at which the transistors Tr4 and Tr5 are connected in series. The processing unit 21 turns ON and OFF the transistors Tr2 through Tr5 of the vibration control unit 26 so that the driving current shown in FIG. 20 is supplied to the coil 15. The direction of the driving current alternately varies at a given cycle, as shown in FIG. 20.

In operation, the processing unit 21 reads waveform data from the memory unit 22, and supplies it to the vibration control unit 26. The H-bridge circuit of the vibration control unit 26 supplies the driving current shown in FIG. 20 to the coil 15. The driving current that flows in the coil 15 during the period between time t1 and time t2 produces the magnetic field that outgoes from the N pole of the second magnet 17 and crosses the coil 15. Thus, thrust F is upward exerted on the coil 15 due to the Fleming's left-hand rule.

The current flows in the coil in the opposite direction during the period between time t2 and time t3. The magnetic field from the N pole of the second magnet 17 crosses the current flowing in the coil 15, so that thrust F is downward exerted on the coil 15 due to the Fleming's left-hand rule. In this manner, the touch panel can be vibrated in the direction perpendicular to the input surface of the touch panel 4.

According to the seventh embodiment of the present invention, the vibrating direction of the touch panel 4 can be changed alternately.

The present invention is not limited to the specifically disclosed embodiments, and other embodiments, variations and modifications may be made without departing from the scope of the present invention. For example, the above-mentioned touch panels are examples of the operation unit, and a touch pad or another type of the operation unit is included in the present invention.

The present invention is based on Japanese Patent Application No. 2003-292549 filed on Aug. 12, 2003, the entire disclose of which is hereby incorporated by reference.

What is claimed is:

1. A coordinates input device comprising:
an operation unit that receives an operation input;
a vibration generator that applies a vibration to the operation unit; and
a vibration control unit that controls the vibration generator to apply the vibration to the operation unit when the operation input is received by the operation unit,
the vibration generator including:
a power feed unit provided to the operation unit; and
a magnetic-field applying unit having sub-units,
each of the sub-units having first and second magnets spaced apart from each other with a given gap, a magnetic flux produced by the first and second magnets crossing a current flowing in the power feed unit, each of the sub-units being arranged under the operation unit.

2. The coordinates input device as claimed in claim 1, wherein:
the power feed unit comprises a coil arranged along sides of the operation unit; and
the sub-units of the magnetic-field applying unit are arranged along the sides of the operation unit.

3. The coordinates input device as claimed in claim 1, wherein:
the power feed unit comprises coils arranged along sides of the operation unit; and
the sub-units of the magnetic-field applying unit are arranged along the sides of the operation unit.

4. The coordinates input device as claimed in claim 3, wherein each of the sub-units of the magnetic-field applying unit faces a part of a corresponding one of the coils.

5. The coordinates input device as claimed in claim 1, wherein:
the power feed unit comprises two coils arranged along opposing sides of the operation unit; and
the sub-units of the magnetic-field applying unit are arranged along the opposing sides of the operation unit.

6. The coordinates input device as claimed in claim 1, wherein:
the power feed unit comprises four coils arranged along four sides of the operation unit; and
the sub-units of the magnetic-field applying unit are arranged along the sides of the operation unit.

7. The coordinates input device as claimed in claim 1, wherein:
each of the sub-units comprises a third magnet spaced apart from the second magnet with another given gap; and
another magnetic flux produced by the second and third magnets crossing the current flowing in the power feed unit.

8. The coordinates input device as claimed in claim 1, wherein:
the power feed unit comprises coils arranged along sides of the operation unit;
the sub-units of the magnetic-field applying unit are arranged along the sides of the operation unit;
each of the sub-units comprises a third magnet spaced apart from the second magnet with another given gap; and
another magnetic flux produced by the second and third magnets crossing the current flowing in the power feed unit.

9. The coordinates input device as claimed in claim 1, further comprising a spacer provided in the given gap.

10. The coordinates input device as claimed in claim 1, wherein:
the power feed unit comprises coils arranged along sides of the operation unit; and
the vibration control unit supplies driving currents to the coils.

11. The coordinates input device as claimed in claim 1, wherein the vibration control unit periodically changes a direction in which the current that flows in the power feed unit.

12. The coordinates input device as claimed in claim 1, further comprising members that slide the operation unit.

13. The coordinates input device as claimed in claim 1, further comprising:
members that slide the operation unit; and
a detector that detects a slide of the operation unit.

14. The coordinates input device as claimed in claim 1, wherein the vibration control unit comprises an H-bridge circuit of transistors.

15. The coordinates input device as claimed in claim 1, wherein the operation unit includes a touch panel.

16. The coordinates input device as claimed in claim 1, further comprising a display unit, wherein the vibration generator is interposed between the operation unit and the display unit.

17. A vibration generator to apply vibration to an input unit of a coordinates input device, comprising:
a power feed unit coupled to and provided under the input unit;
one or more magnetic-field applying units provided under the power feed unit;
wherein each of the magnetic-field applying units includes at least first and second magnets, spaced with a gap between, to produce a magnetic flux to cross a current in the power feed unit.

18. A coordinates input device comprising:
an operation unit that receives an operation input;
a vibration generator that applies a vibration to the operation unit; and
a vibration control unit that controls the vibration generator to apply the vibration to the operation unit when the operation input is received by the operation unit,
the vibration generator including:
a power feed unit provided to the operation unit; and
a magnetic-field applying unit having sub-units,
each of the sub-units having first and second magnets spaced apart from each other with a given gap, a magnetic flux produced by the first and second magnets crossing a current flowing in the power feed unit;
wherein the power feed unit comprises two coils arranged along opposing sides of the operation unit; and
the sub-units of the magnetic-field applying unit are arranged along the opposing sides of the operation unit.

19. A coordinates input device comprising:
an operation unit that receives an operation input;
a vibration generator that applies a vibration to the operation unit; and
a vibration control unit that controls the vibration generator to apply the vibration to the operation unit when the operation input is received by the operation unit, the vibration generator including:
a power feed unit provided to the operation unit; and
a magnetic-field applying unit having sub-units,
each of the sub-units having first and second magnets spaced apart from each other with a given gap, a magnetic flux produced by the first and second magnets crossing a current flowing in the power feed unit;
wherein the power feed unit comprises four coils arranged along four sides of the operation unit; and
the sub-units of the magnetic-field applying unit are arranged along the sides of the operation unit.

20. A coordinates input device comprising:
an operation unit that receives an operation input;
a vibration generator that applies a vibration to the operation unit; and
a vibration control unit that controls the vibration generator to apply the vibration to the operation unit when the operation input is received by the operation unit,
the vibration generator including:
a power feed unit provided to the operation unit; and
a magnetic-field applying unit having sub-units,
each of the sub-units having first and second magnets spaced apart from each other with a given gap, a magnetic flux produced by the first and second magnets crossing a current flowing in the power feed unit;
wherein each of the sub-units comprises a third magnet spaced apart from the second magnet with another given gap; and
another magnetic flux produced by the second and third magnets crossing the current flowing in the power feed unit.

21. A coordinates input device comprising:
an operation unit that receives an operation input;
a vibration generator that applies a vibration to the operation unit; and
a vibration control unit that controls the vibration generator to apply the vibration to the operation unit when the operation input is received by the operation unit,
the vibration generator including:
a power feed unit provided to the operation unit; and
a magnetic-field applying unit having sub-units,
each of the sub-units having first and second magnets spaced apart from each other with a given gap, a magnetic flux produced by the first and second magnets crossing a current flowing in the power feed unit;
wherein the power feed unit comprises coils arranged along sides of the operation unit;
the sub-units of the magnetic-field applying unit are arranged along the sides of the operation unit;
each of the sub-units comprises a third magnet spaced apart from the second magnet with another given gap; and
another magnetic flux produced by the second and third magnets crossing the current flowing in the power feed unit.

22. A coordinates input device comprising:
an operation unit that receives an operation input;
a vibration generator that applies a vibration to the operation unit; and
a vibration control unit that controls the vibration generator to apply the vibration to the operation unit when the operation input is received by the operation unit,
the vibration generator including:
a power feed unit provided to the operation unit; and
a magnetic-field applying unit having sub-units,
each of the sub-units having first and second magnets spaced apart from each other with a given gap, and a spacer provided in the given gap, a magnetic flux produced by the first and second magnets crossing a current flowing in the power feed unit.

23. A coordinates input device comprising:
an operation unit that receives an operation input;
members that slide the operation unit;
a detector that detects a slide of the operation unit;
a vibration generator that applies a vibration to the operation unit; and
a vibration control unit that controls the vibration generator to apply the vibration to the operation unit when the operation input is received by the operation unit,
the vibration generator including:
a power feed unit provided to the operation unit; and
a magnetic-field applying unit having sub-units,
each of the sub-units having first and second magnets spaced apart from each other with a given gap, a magnetic flux produced by the first and second magnets crossing a current flowing in the power feed unit.

24. A coordinates input device comprising:
an operation unit that receives an operation input;
a vibration generator that applies a vibration to the operation unit; and
a vibration control unit that controls the vibration generator to apply the vibration to the operation unit when the operation input is received by the operation unit,
the vibration generator including:
a power feed unit provided to the operation unit; and
a magnetic-field applying unit having sub-units,
each of the sub-units having first and second magnets spaced apart from each other with a given gap, a magnetic flux produced by the first and second magnets crossing a current flowing in the power feed unit;
wherein the vibration control unit comprises an H-bridge circuit of transistors.

* * * * *